Patented May 2, 1944

2,347,652

UNITED STATES PATENT OFFICE 2,347,652

METHOD OF MAKING 3,4-DIMETHYL-ANILINE

Walter A. Wisansky, Forest Hills, N. Y., assignor, by mesne assignments, to American Home Products Corporation, Jersey City, N. J., a corporation of Delaware No Drawing. Application July 19, 1941,
Serial No. 403,163

3 Claims. (Cl. 260—581)

This invention relates to a new and improved method of making 3,4-dimethyl-aniline, the formula of which is:

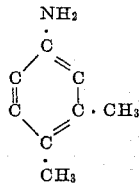

This xylidine is usually made by nitrating ortho-xylene to form 1-nitro-3,4-dimethyl-benzene which is isolated from other reaction products by a tedious procedure and which is then reduced, by means of a platinum catalyst and hydrogen, and distilled in vacuum.

I have discovered that 3,4-dimethyl-aniline can be formed by selecting 4-bromo-ortho-xylene and reacting it with ammonia. I have found that a high yield of 3,4-dimethyl-aniline is obtainable by high-pressure ammonolysis of 4-bromo-ortho-xylene in the presence of a copper catalyst. By this process the 3,4-dimethyl-aniline is obtained as a substance free from isomers and without unduly long separation procedures.

The following is a specific example illustrating my invention:

In a bomb of a high pressure hydrogenator, 200 g. of 4-bromo-ortho-xylene, 14 g. of copper wire and 600 ml. of 28-29% ammonia containing 12 g. of cuprous chloride were placed and treated at 195° C. and 900–1000 lb. per square inch pressure for 14 hours under agitation by tilting back and forth. The bomb was emptied after cooling, the two layers were separated and 40 ml. of 40% alkali was added to the organic layer. The product was steam distilled and the crude xylidine, which crystallized on cooling, was further purified by dissolving it in 500 ml. of 8% hydrochloric acid, and extracting the acid solution twice with 100 ml. portions of ether. The acid solution was made alkaline with 160 ml. of 40% alkali and steam distilled. The distillate was cooled and filtered and the product thus obtained was further purified by vacuum distillation at 116–118° and 22–25 mm.

The yield of 3,4-dimethyl-aniline obtained according to the foregoing specific example was 103 grams (79%). A particular advantage of my method is that the product thus produced is free from isomers. It is useful in the synthesis of riboflavin.

It will be understood that my invention is not limited to the details given in the foregoing specific example. For instance, a mechanically stirred autoclave may be used instead of the apparatus mentioned. The temperatures and pressures may be varied and other suitable catalysts may be employed. The amount of ammonia may be varied greatly and may be considerably less than the excess used in the example.

What I claim is:

1. The process of making 3,4-dimethyl-aniline which consists in selecting 4-bromo-ortho-xylene and ammonolysing it.

2. The process as claimed in claim 1 wherein 4-bromo-ortho-xylene is ammonolysed at an elevated temperature and pressure, in accordance with the description, in the presence of a catalyst including copper.

3. The process as claimed in claim 1 wherein 4-bromo-ortho-xylene is ammonolysed at a temperature in the order of 195° C. and under pressure in the order of 900–1000 pounds per square inch in the presence of a catalyst including metallic copper and a copper salt.

WALTER A. WISANSKY.